(12) United States Patent
Rotem et al.

(10) Patent No.: US 7,878,016 B2
(45) Date of Patent: Feb. 1, 2011

(54) DEVICE AND METHOD FOR ON-DIE TEMPERATURE MEASUREMENT

(75) Inventors: Efraim Rotem, Haifa (IL); Jim G. Hermerding, San Jose, CA (US); Eric Distefano, Livermore, CA (US); Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1499 days.

(21) Appl. No.: 11/025,140

(22) Filed: Dec. 30, 2004

(65) Prior Publication Data

US 2006/0149974 A1 Jul. 6, 2006

(51) Int. Cl.
 F25D 23/12 (2006.01)
 G01K 1/08 (2006.01)
 G06F 1/00 (2006.01)
(52) U.S. Cl. .................. 62/259.2; 702/132; 713/300
(58) Field of Classification Search ............... 62/259.2; 713/300, 501; 374/141, 166, 170; 257/723; 702/132
See application file for complete search history.

(56) References Cited

U.S. PATENT DOCUMENTS

| 5,502,838 | A | 3/1996 | Kikinis |
| 5,752,011 | A | 5/1998 | Thomas et al. |
| 5,838,578 | A | 11/1998 | Pippin |
| 5,974,557 | A | 10/1999 | Thomas et al. |
| 6,216,235 | B1 | 4/2001 | Thomas et al. |
| 6,487,668 | B2 | 11/2002 | Thomas et al. |
| 6,630,754 | B1 | 12/2005 | Pippin |
| 6,975,047 | B2 | 12/2005 | Pippin |
| 7,167,993 | B1 | 1/2007 | Thomas et al. |
| 7,216,064 | B1 | 5/2007 | Pippin |
| 7,228,508 | B1 | 6/2007 | Pippin |
| 7,293,186 | B2 | 11/2007 | Thomas et al. |
| 7,418,611 | B1 | 8/2008 | Thomas et al. |
| 7,506,190 | B2 | 3/2009 | Thomas et al. |
| 7,587,262 | B1 | 9/2009 | Pippin |
| 2001/0021217 | A1* | 9/2001 | Gunther et al. ............. 374/178 |
| 2002/0065049 | A1 | 5/2002 | Chauvel et al. |
| 2003/0110423 | A1* | 6/2003 | Helms et al. ................ 714/100 |
| 2003/0212474 | A1 | 11/2003 | Pippin |
| 2004/0024561 | A1* | 2/2004 | Huckaby et al. ............ 702/132 |
| 2004/0095986 | A1* | 5/2004 | Tsuchiya .................... 374/163 |
| 2005/0180488 | A1 | 8/2005 | Rusu et al. |

FOREIGN PATENT DOCUMENTS

| EP | 0 851 336 A1 | 7/1998 |
| EP | 0851336 A1 | 7/1998 |
| WO | 2004019195 A2 | 3/2004 |

* cited by examiner

*Primary Examiner*—Chen-Wen Jiang
(74) *Attorney, Agent, or Firm*—Kacvinsky Daisak PLLC

(57) ABSTRACT

A system for measuring and managing thermal operations of a processor core on a semiconductor die using a sensor positioned in a hotspot of the processor core. A measured temperature reading is determined based upon a temperature sensed by the sensor. Interrupt signals and a software readable register indicating temperature information provide feedback about the thermal environment to the processor. Based upon the measured temperature reading, the interrupt signals direct the processor to modify operation.

11 Claims, 13 Drawing Sheets

DEVICE AND METHOD FOR ON-DIE TEMPERATURE MEASUREMENT

TECHNICAL FIELD

Embodiments of the present invention relate to devices and methods for temperature measurement of processor cores, and more particularly to on-die circuits and methods for temperature measurement and reporting.

BACKGROUND

Modern central processing units ("CPUs"), with increasing processor core frequencies and power densities, are rapidly reaching a point in which the CPU performance is limited by the amount of heat that can be extracted from the CPU by cooling technology.

High performance CPUs sometimes integrate an on-die thermal diode that converts junction temperatures to some electric value. External analog-to-digital ("A/D") devices can be found on several computer platforms, converting the electric value into usable information for temperature control.

Due to routing and accuracy limitations, the thermal diode is placed in locations which are not at a hotspot of the CPU. A hotspot is a localized region having a higher temperature than regions of the processor adjoining the hotspot. Temperature differences, as high as 15° C. have been observed between the diode location and the hotspot. The result is inaccurate temperature readings and discrepancy between the reported value and the actual temperature used for device specification and control. Inaccurate temperature reading leads to inclusion of higher design margins, increased cooling costs and limited functionality.

Another thermal protection mechanism uses a separate sensor to detect a maximum threshold temperature at the hottest hotspot on the die. Once the threshold is reached, a single trigger occurs and thermal protection is initiated. Other than this single trigger, the sensor provides no other feedback for use in thermal or acoustic management.

If this second sensor is external to the device, the external sensor suffers from time delay and accuracy problems resulting from the physical separation of the sensor from the hotspot.

There is a need for improved on-die temperature monitoring to improve performance in a thermally constrained environment. There is also a need for faster and more accurate reporting, eliminating gaps between thermal measurement and control.

BRIEF DESCRIPTION OF THE DRAWINGS

FIG. 10 illustrates an alternative measurement circuit which can be interchanged with the measurement circuit of the second and third embodiments to measure temperature for multiple hotspots.

DETAILED DESCRIPTION

Embodiments of the present invention integrate a sensor at a hotspot of the die for the measurement and reporting of temperature values, and for the generation of notifications. Using a single sensor to provide both temperature-responsive triggers and temperature measurement improves the speed, consistency, and accuracy of temperature reporting. Processor operation can be optimized, maximizing performance in a thermally constrained environment.

The temperature responsive triggers may be utilized to direct both on-die and off-die temperature control, including directing the processor to modify operation, activating external fans or cooling systems, modifying the output of an external power supply, and/or putting a portion or an entirety of the processor into a standby state. Examples of modifying processor operation include modifying clock speeds of the processor and modifying operating voltages of the processor. Reporting of a measured temperature may be utilized, for among other things, to provide feedback to the processor.

For processors utilizing software control mechanisms triggered by management systems such as Advanced Configuration and Power Interface ("ACPI"; Revision 3.0, September 2004: Intel Corp., et al.) or System Management Mode ("SMM"), direct on-die temperature reporting is particularly advantageous, since the ability to report temperatures through the processor to native software improves response time, and provides system designers and manufacturer increased flexibility for adapting processor operation. Flexibility can be further increased by using software-programmable temperature-responsive triggers, which may, for example, be programmed by software and/or firmware instructions executed on the processor (e.g., by third-party software, the operating system, and/or the Basic Input/Output System ("BIOS")) or be programmed by fuse or other firmware on the die (e.g., programmed by a manufacturer or distributor).

Prior to fabrication, at least one hotspot of the processor is identified by either modeling, empirical data, analysis of the package, and/or by other conventional techniques. A temperature sensor is fabricated in the hotspot, modifying the layout of the circuit to provide for the sensor, if necessary. The sensor may be any temperature sensitive device, such as a p-n junction device (e.g., a diode or transistor) or a temperature sensitive resistor. Advantages of P-N junction devices, besides being easy to integrate onto the processor, are a very quick response to temperature changes and that P-N junction devices do not need a reference temperature (i.e., in comparison to thermocouples). In the embodiments herein, the sensors shown are diodes. However, it should be understood that diodes are only used as an example and that other sensor-types may be also be used.

Figure 1:
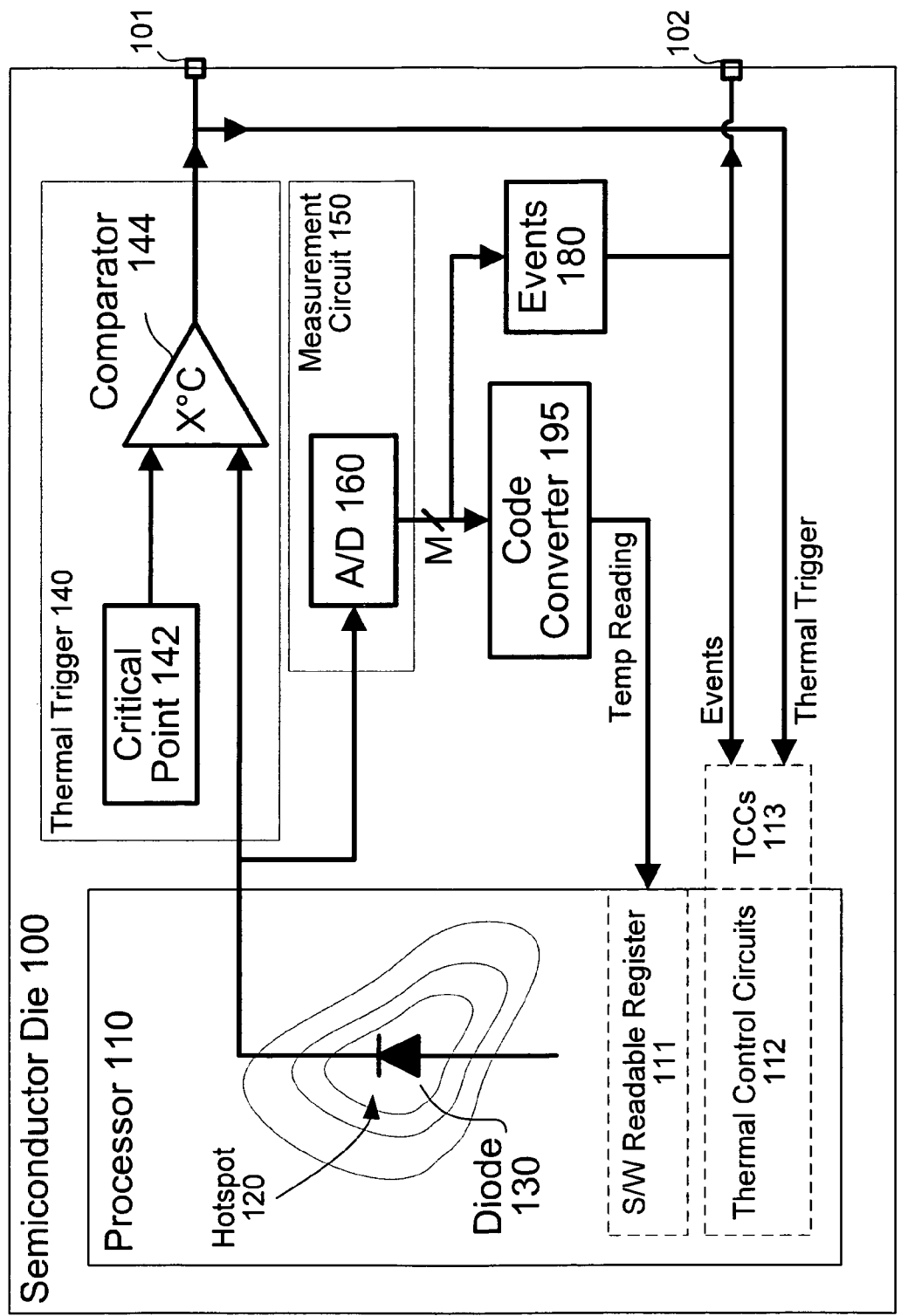
FIG. 1 is a schematic diagram of a first embodiment of the invention.

A first embodiment of the invention is illustrated in FIG. 1. A processor 110 and temperature control circuitry are integrated on a semiconductor die 100. A diode 130 is located within hotspot 120. The voltage drop across the diode 130 changes with the temperature of the hotspot 120.

The voltage across diode 130 is provided to a thermal trigger circuit 140 and a measurement circuit 160. In the thermal trigger circuit 140, the diode voltage is compared with a critical point voltage 142 by analog comparator 144. The critical point voltage 142 corresponds to a threshold temperature, such as a maximum thermal operating limit for the processor. By utilizing a simple circuit such as an analog comparator to determine temperature, threshold reporting is near-instantaneous.

Critical point 142 can be fixed or adjustable. A way to provide critical point 142 is by using a digital-to-analog converter to read a register holding a temperature value (not illustrated). The output of the digital-to-analog converter is then provided as input to comparator 144. By programming the register, the threshold can be adjusted.

The thermal trigger signal, output by comparator 144, is provided to thermal control circuits 112 and/or 113. The thermal trigger signal may be provided as an output 101 from the die 100. When the temperature signal (i.e., voltage) from the diode 130 equals or exceeds the critical point 142, the thermal control circuits 112/113 initiate on-die thermal protection, such as a reduction of operating voltage or a reduction of operating frequency. Additionally, the thermal trigger signal may be output from the die to control external thermal control apparatus.

Measurement circuit 150 also receives the temperature signal from the diode 130. An analog-to-digital converter 160 of measurement circuit 150 converts the diode voltage into an M-bit digital value. This M-bit digital value serves as a raw measured temperature reading. The processor 110 may include a software readable register 111, to receive the measured temperature reading. An example of the software readable register 111 is model-specific register (MSR) address space. Alternatively, a code converter 195 can be included to include the raw measured temperature reading into a formatted temperature, which is them provided to the software readable register 111. Use of the code converter 195 allows for compensation of any non-linearity in the raw value, and allows the measured temperature value to be scaled (e.g., Celsius, Fahrenheit). A simple implementation for code converter 195 is a non-volatile memory look-up table.

Figure 6:
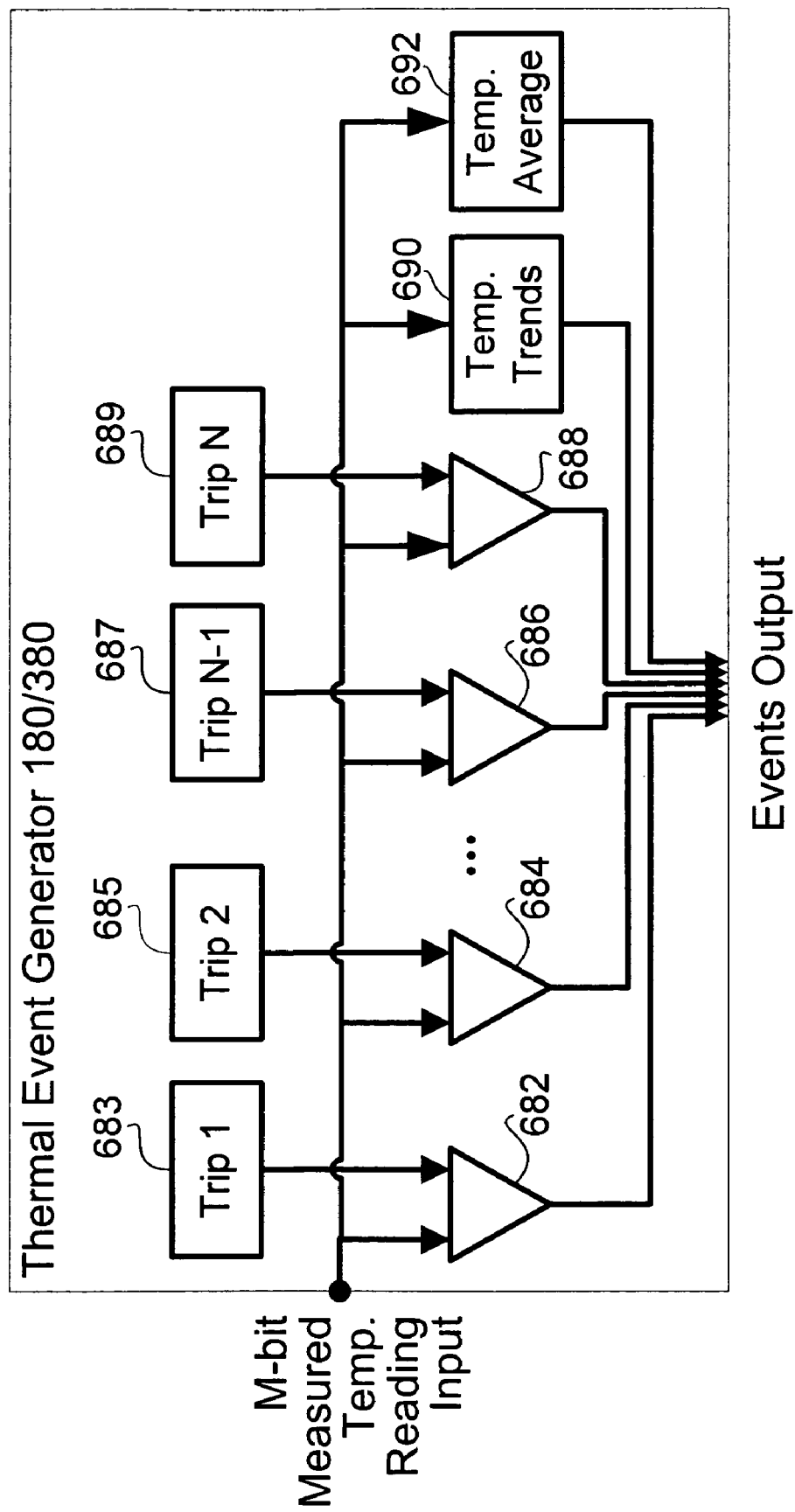
FIG. 6 illustrates the operation of an embodiment of a thermal event generator.

The measured temperature reading from measurement circuit 150 is also provided to a thermal event detection circuit 180, which directs the processor to modify processor-operation based upon the measured temperature reading. As shown in FIG. 6, the thermal event detection circuit 180 comprises a plurality of programmable trip points (683, 685, 687, and 689), each of which are compared (682, 684, 686, and 688) to measured temperature reading. The results of the comparisons are provided to the processor 110 by means of interrupts, and can also be used for other on-die and off-die thermal protection control. One way to generate interrupts is through a programmable interrupt controller ("PIC") such as an advanced programmable interrupt controller ("APIC"). The PIC can be included in the thermal control circuits 112/113, or can be a separate circuit. One or more of the results of the comparisons by events circuit 180 may be provided as an output 102 from the die 100.

As can be understood from the time delays inherent in the circuitry involved, even if the critical point 142 and a trip point (683/685/687/689) are set to a same threshold value, the thermal trigger 140 will respond more quickly than event circuit 180. Accordingly, the critical point 140 may be set for a maximum temperature threshold value the processor can tolerate, since the speed of response can impact processor survivability.

Thermal event detection circuit 180 also may include a circuit 690 directing the processor according to trends of the measured temperature reading over time, and a circuit 692 directing the processor based on an average temperature over time. An example of circuit 690 is at least one memory element to register temperature at a previous time or times and a comparison circuit to compare this previous temperature or temperatures to the current temperature. An example of circuit 392 is at least one memory element to accumulate an average result and at least one computation element to modify the average result in accordance to current temperature, such as a differentiator sampling the value every period N and calculating Trand=T(n)−T(n−1).

Figure 2:
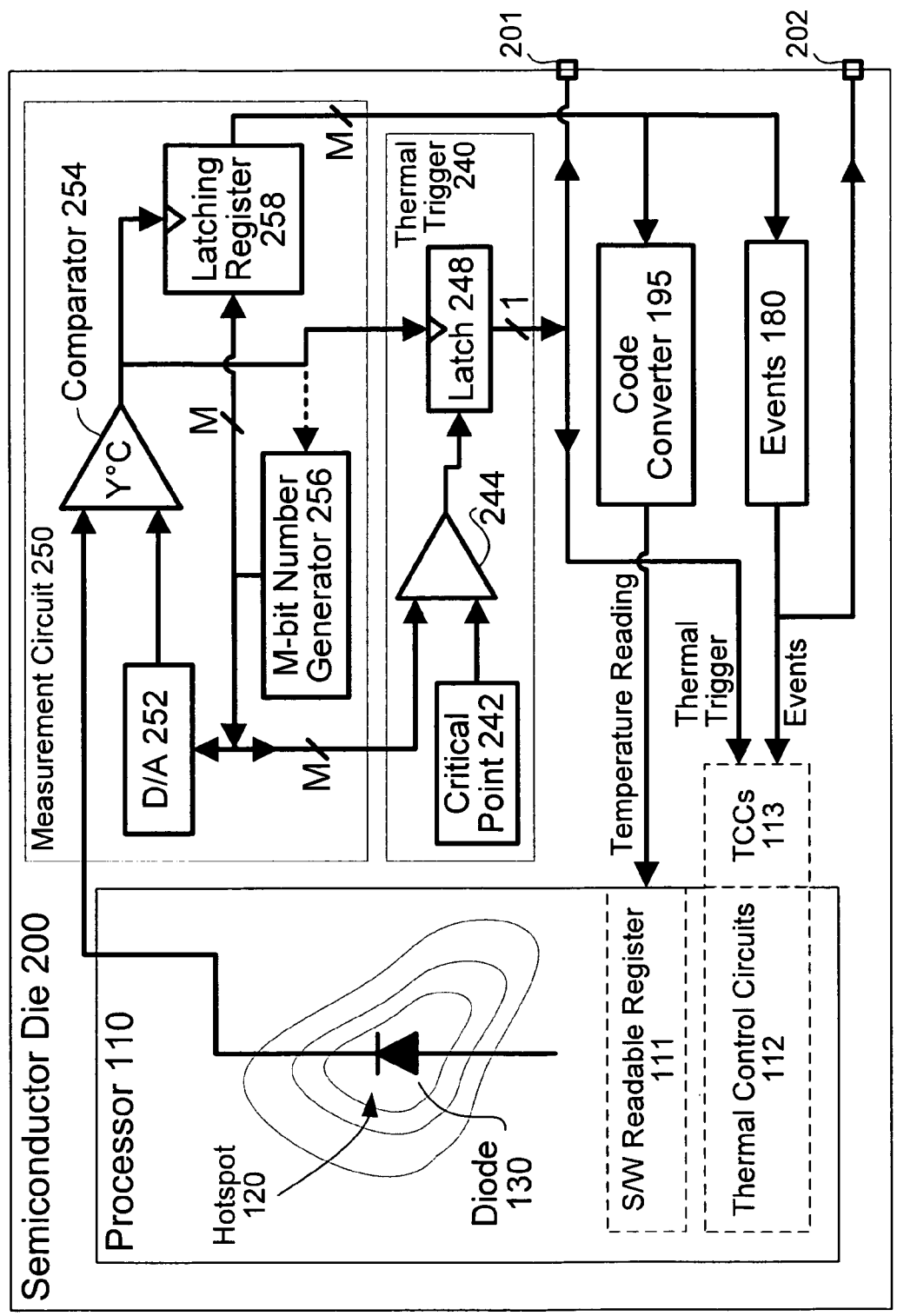
FIG. 2 is a schematic diagram of a second embodiment of the invention.

FIG. 2 illustrates a second embodiment of the invention. Semiconductor die 200 again includes processor 110, code converter 195, and events circuit 180, as in the first embodiment; and one or more of the comparison results by events circuit 180 may be provided as an output 202 from the die 200. However, the thermal trigger circuit 240 and measurement circuit 250 are different.

Measurement circuit 250 utilizes digital feedback to determine the temperature of the hotspot. Number generator 256 generates a number corresponding to an interim temperature value within a range of temperatures. The interim temperature value is converted into an analog voltage by digital-to-analog converter 252, and comparator 254 compares the analog value with the diode voltage. If the hotspot temperature is approximately equal to the interim temperature value, the interim temperature value is stored in latching register 258, and the number generator 256 can either be reset, or number generation can continue, depending upon the particular technique used. Otherwise, another interim temperature is generated.

This can be better understood by considering particular implementations for number generation, such as linear searches and successive approximation (e.g., a, binary search). The simplest example is a linear search using an up-down counter.

For example, consider a counter sweeping the temperature range, with the hotspot temperature being fixed at a temperature within the range. If the hotspot temperature lies between two interim temperatures produced by the number generator 256, the results are not exact. On an up-sweep of the temperature range, the comparator output 254 will undergo a transition when the hotspot temperature equals or exceeds the interim temperature values. Thus, the register 258 will latch a temperature value that is slightly higher than the actual temperature. Additionally, if a down-sweep is performed for the same diode temperature, the result is different than for the up-sweep (off by one). The accuracy is therefore directly dependent upon the interim temperature-granularity provided by number generator, such that the measured temperature is approximate.

Figure 7:
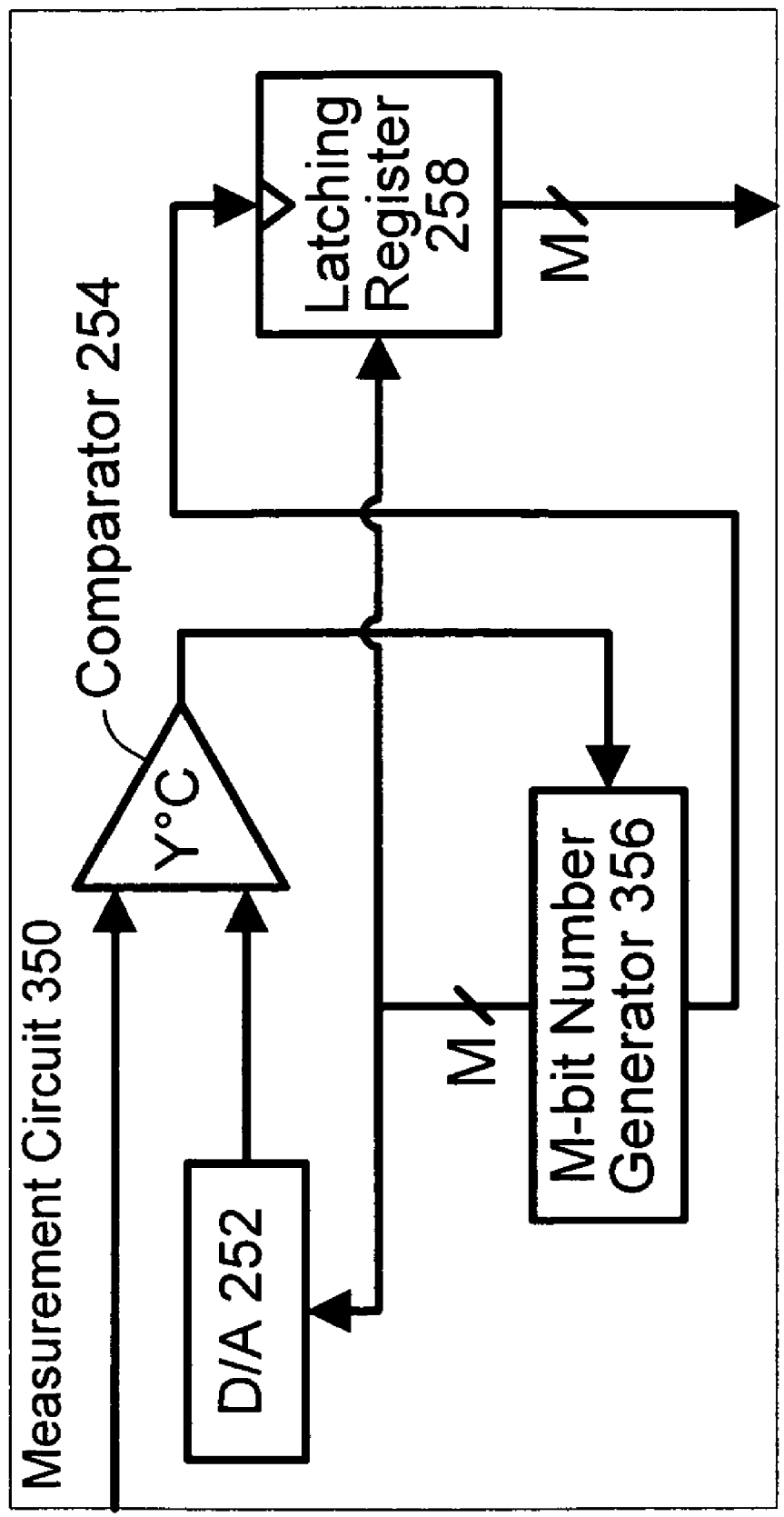
FIG. 7 illustrates an alternative measurement circuit which can be interchanged with the measurement circuit of the second and third embodiments

Using the output of comparator 254 to latch register 258 is appropriate with search techniques which will result in comparator transitions at approximately the hotspot temperature. However, if a non-linear search is used, such as a binary search, latching the register in this manner will result in errors, since a binary search can under-shoot and over-shoot the actual temperature during the search. In this case, relying on the output of comparator 254 as the trigger of latching register 258 results in inaccurate readings. Instead, as shown in FIG. 7, measurement circuit 350 includes a number generator 356 that itself latches the latching register 258.

Any number of circuits can be used to perform a binary search. For example, a binary search can be performed utilizing two registers, a subtractor, and some basic logic. One register stores a high temperature value, whereas the other register stores a low temperature value. An intermediate value between high and low is determined by subtracting the low temperature value from high temperature value in the subtractor and dividing by 2 (e.g., dropping the lowest order bit subtraction result). This intermediate value is output as the interim temperature value. If the comparator 254 indicates that the hotspot is hotter than the interim temperature value, then low temperature value is set to the intermediate temperature and the process is repeated. Likewise, if the comparator 254 indicates that the hotspot is cooler than the interim temperature value, then high temperature value is set to the intermediate temperature and the process is repeated. The process ends with a triggering of the latching register when the low register and high register lock (i.e., are equal or approximately equal), such that the search is over. Other types of searches can be performed in a similar manner, and lookup table or an arithmetic logic unit ("ALU") can also be used to determine the intermediate value, instead of the binary subtractor.

Measurement circuits 250 and 350 may also signal the processor and/or thermal control circuitry if the temperature sensed by diode 130 is outside the range of temperatures searched. Examples of how this can be accomplished include: independently comparing the temperature to the high and low values of the range; for a linear search, providing logic utilizing an overflow flag signal of the number generator (e.g., counter) in combination with the comparator 254 output if the full range is swept but no result found; and for a non-linear search, providing logic to signal if an intermediate search temperature value reaches the high or low value, in combination with the comparator 254 output. In such a case, the measured temperature reading is set to be a limit of the range of temperatures closest to the temperature sensed by the diode.

Returning to FIG. 2, another feature of the second embodiment is thermal trigger circuit 240. Digital comparator 244 compares a critical point 242 with the interim temperature value output by the number generator 256/356. Latch 248 latches the output of comparator 244 as the thermal trigger signal. Latch 248 is controlled by the same latching signal used for register 258. The critical point 242 may be programmable. The thermal trigger signal may also be provided as an output 201 from the die 200.

Figure 3:
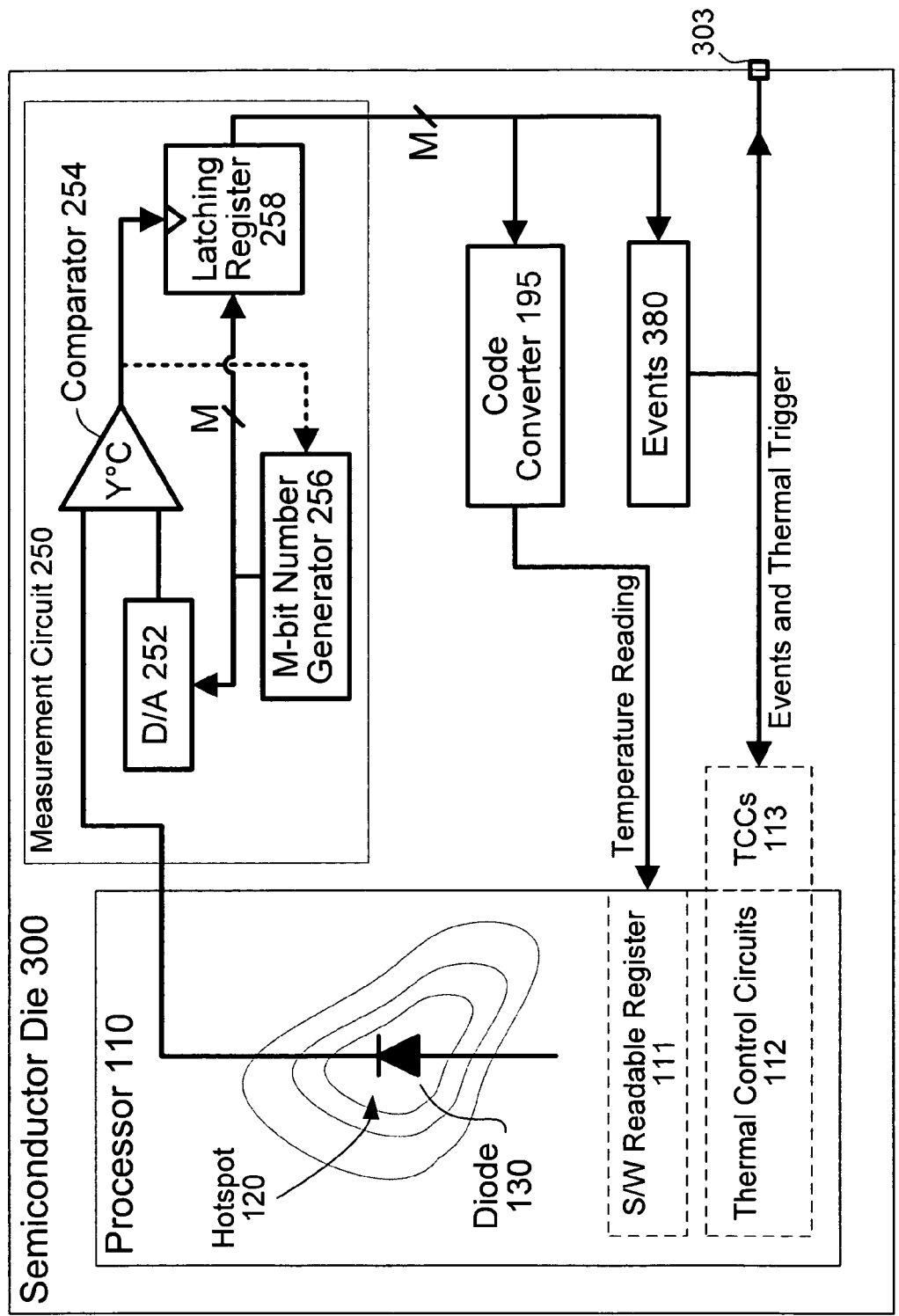
FIG. 3 is a schematic diagram of a third embodiment of the invention.

FIG. 3 illustrates a third embodiment of the invention. Semiconductor die 300 includes processor 110, measurement circuit 250 (or 350), and code converter 195, as described above. In this embodiment, the thermal trigger is incorporated into thermal events circuit 380. This is accomplished by utilizing one of the N-trip points (683, 685, 687, 689) as the critical point. The thermal trigger and/or one or more of the results of the comparisons by events circuit 380 may be provided as output 303 from the die 300.

Figure 4:
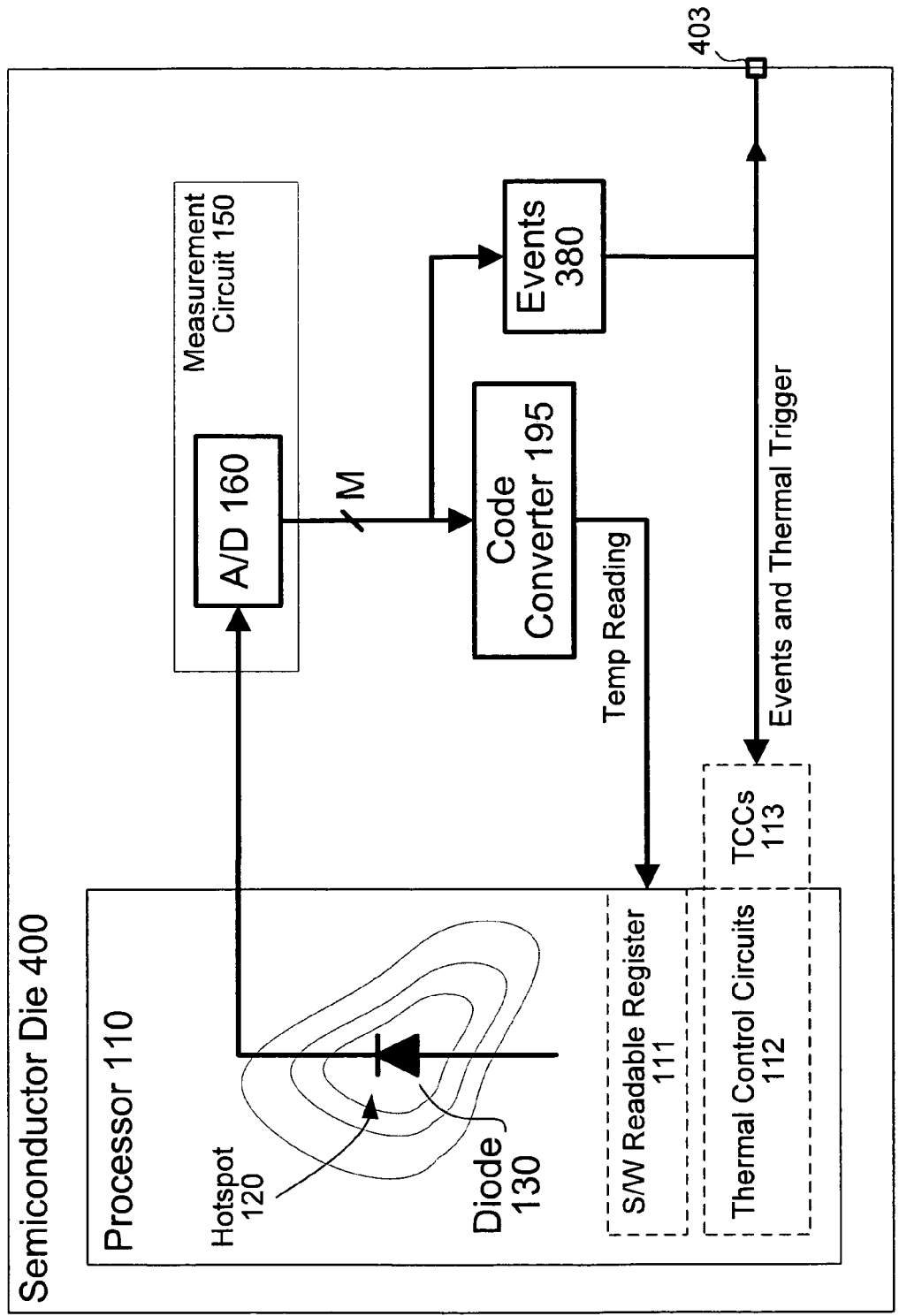
FIG. 4 is a schematic diagram of a hybrid of the first and third embodiments.

FIG. 4 illustrates a hybrid of the first and third embodiments. Semiconductor die 400 includes processor 110, measurement circuit 150, code converter 195, and events circuit 380, as described above. The thermal trigger and/or one or more of the results of the comparisons by events circuit 380 may be provided as output 403 from the die 400.

A disadvantage of generating the thermal trigger using events circuit 380 or thermal trigger 240, instead of thermal trigger circuit 140, is a slight delay in response time. An advantage, however, is a reduction analog circuits, which are more sensitive to temperature and transients than digital circuits, usually operate at higher voltages, and generally require more die space. Other advantages are the relative ease with which digital logic can be programmed by software (e.g., without requiring a digital-to-analog converter ("DAC") to program critical point 142 in thermal trigger circuit 140), and that software-programmable logic can be used instead of hard-wired circuits (thereby increasing die design flexibility).

Figure 5:
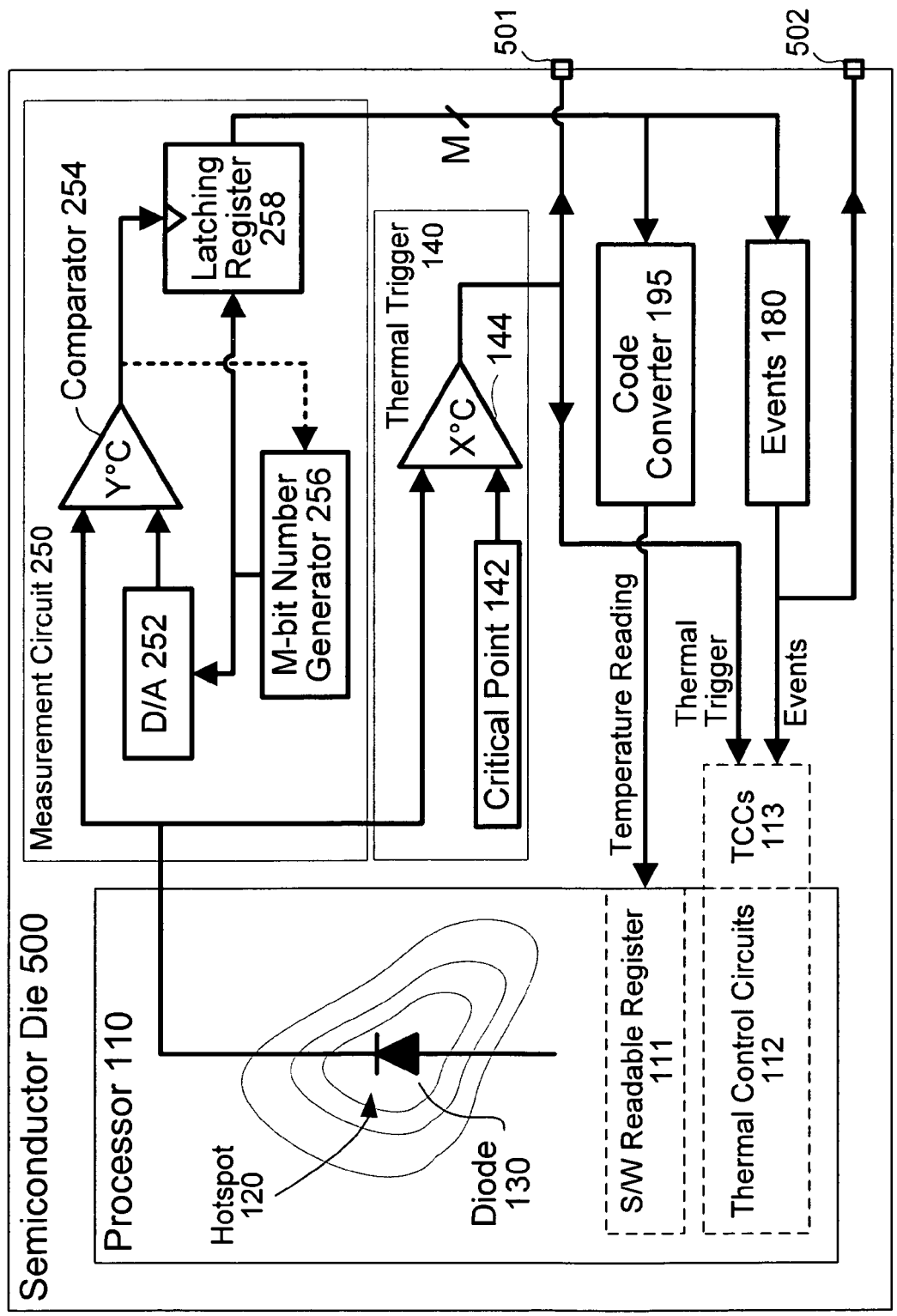
FIG. 5 is a schematic diagram of a hybrid of the first and second embodiments.

FIG. 5 illustrates a hybrid of the first and second embodiments. Semiconductor die 500 includes processor 110, measurement circuit 250 (or 350), code converter 195, and events circuit 380, as described above. The thermal trigger may be provided as an output 501 from the die 500. One or more of the comparison results by events circuit 180 may be provided as an output 502 from the die 500. Here, the advantage of thermal trigger 140 is the critical point response time.

Figure 8:
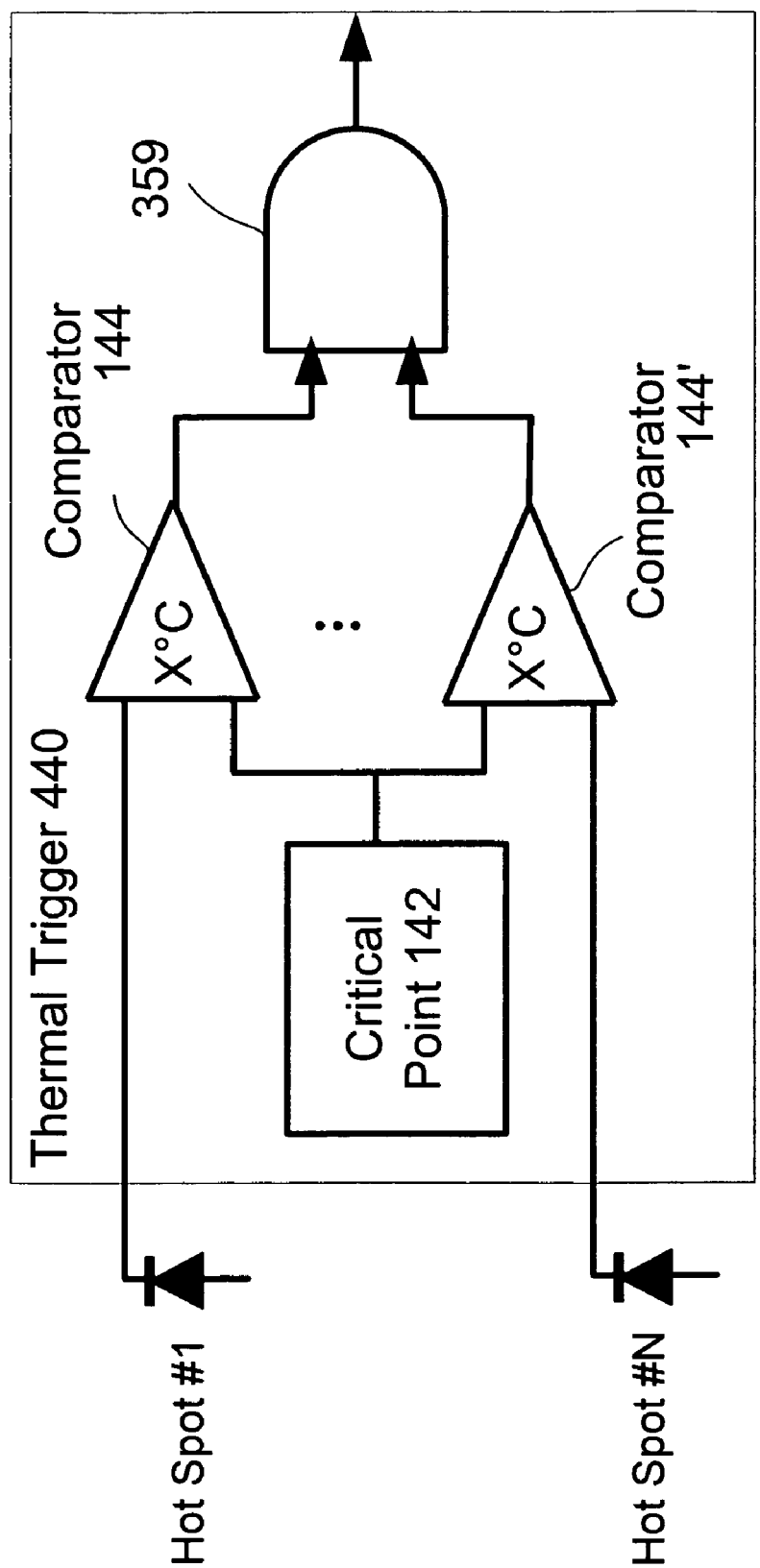
FIG. 8 illustrates a supplemental circuit for the first embodiment of the invention when plural hotspots are monitored, to detect when the hot spots exceed the threshold temperature.

FIG. 8 illustrates a thermal trigger 440 as a variation on the first embodiment of the invention when plural hotspots are monitored. Thermal trigger 440 provides a unified thermal event signal, which can simplify thermal management. If the comparators 144/144' transition from high-to-low when the hotspot temperature exceeds critical point 142, AND-gate 359 transitions to low, thereby signaling that one of the hotspots has exceeded the critical point. If the comparators 144/144' transition from low-to-high when the hotspot exceeds critical point 142, an OR-gate can be used instead of AND-gate 359 to accomplish the same function (not shown). Likewise, the same circuits can be used to determine when all of the hotspots have exceeded the critical point by interchanging AND-for-OR and OR-for-AND in the above description.

Figure 9:
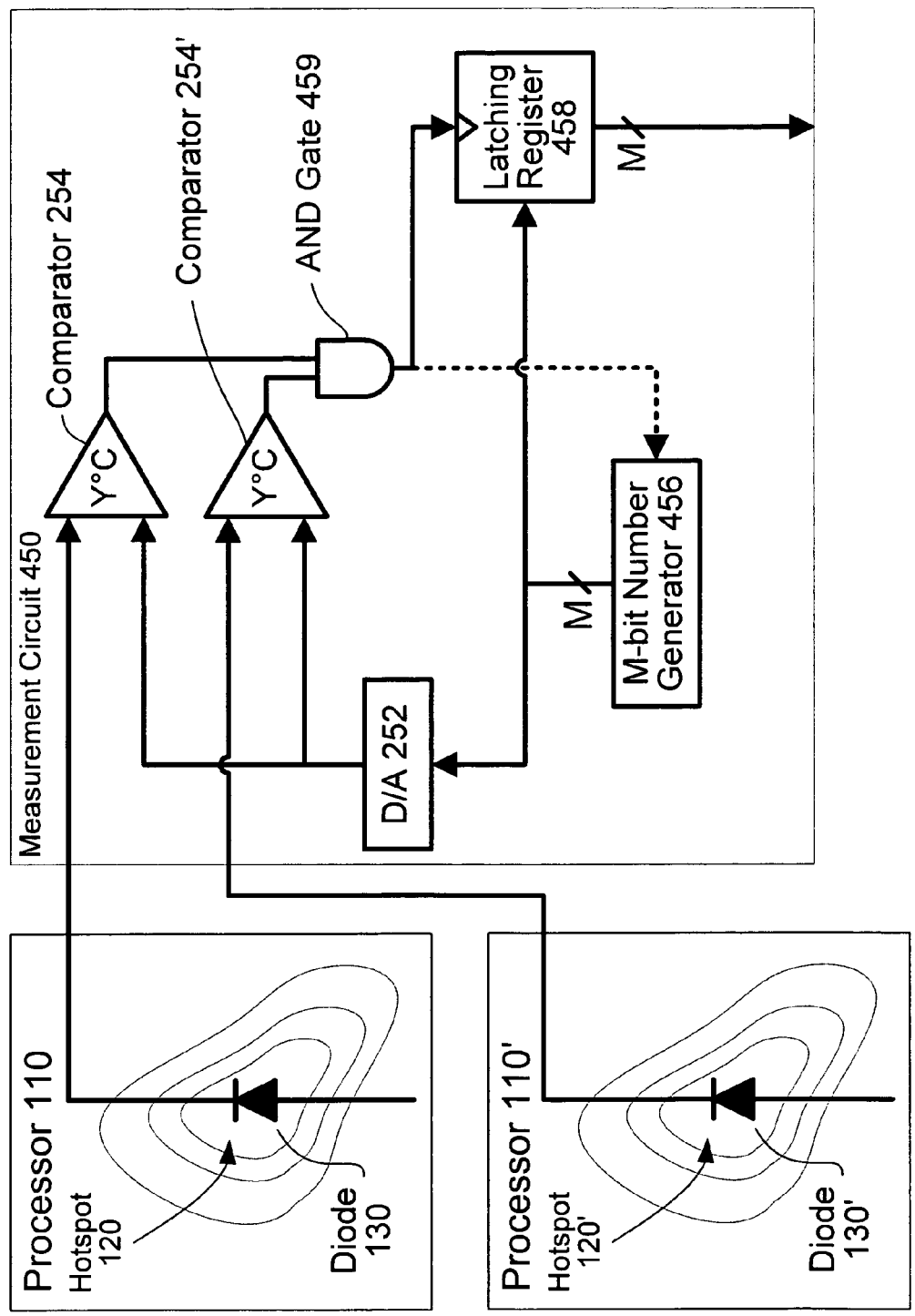
FIGS. 9 and 10 illustrate alternative measurement circuits which can be interchanged with the measurement circuits of the second and third embodiments to measure temperature for multiple hotspots.
Figure 10:
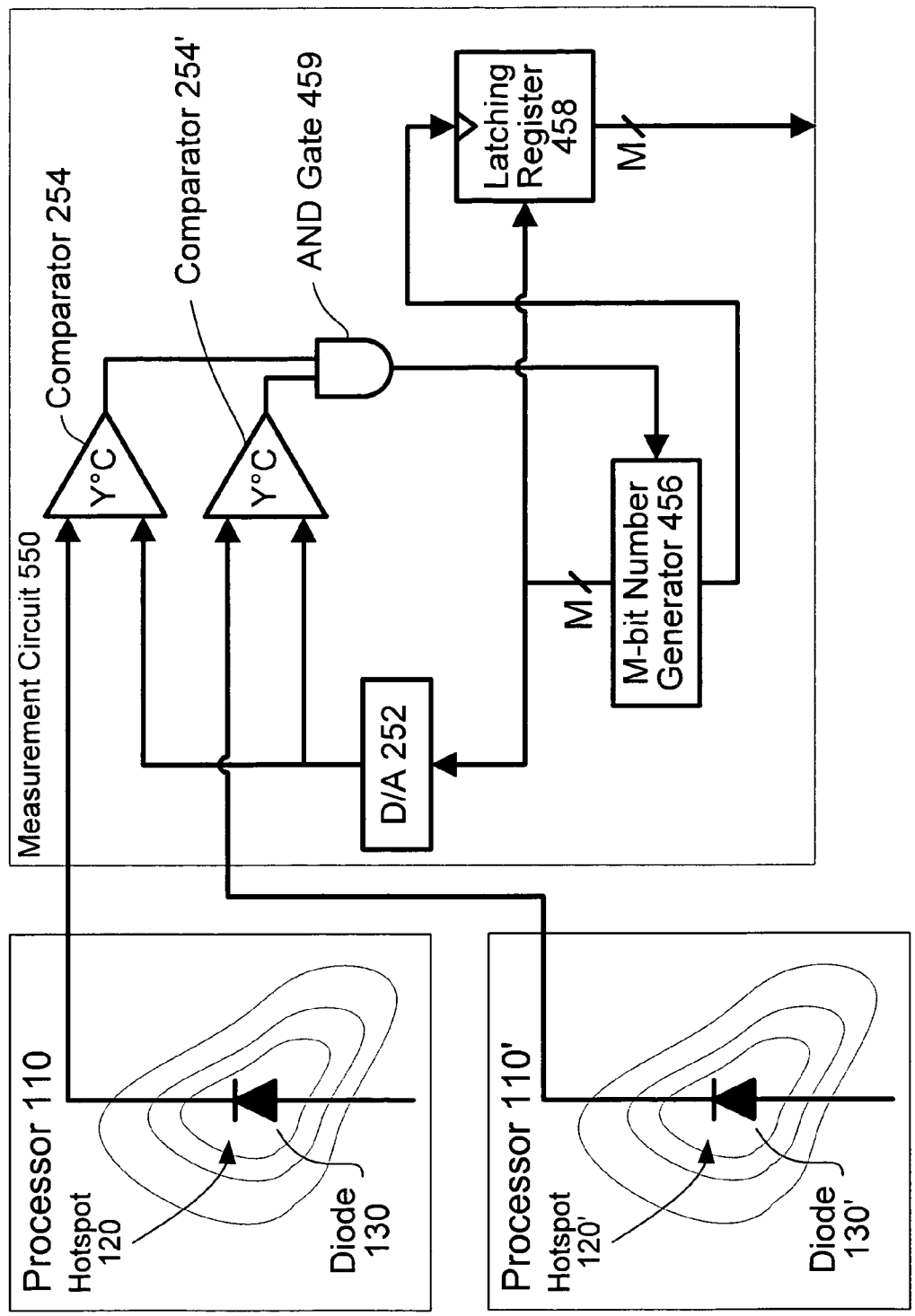

FIGS. 9 and 10 illustrate supplemental measurement circuits which can be interchanged with the measurement circuit from the second and third embodiments to measure a temperature of multiple hotspots. Depending upon whether comparators 254 and 254' are configured to switch from low-to-high or high-to-low when the interim temperature value exceeds the respective hotspot temperature, measurement circuits 450 and 550 either determine the highest or lowest temperature among all of the diodes. As with the embodiment in FIG. 8, an OR-gate can be used instead of an AND-gate, depending upon the result desired. Referring to FIGS. 9 and 10, the number of hotspots monitored can be increased with minimal increase in the size and complexity of the measurement circuit. In addition, central reporting of temperature lends itself to centralized thermal management, which can be performed, for example, by consolidating on-die off-processor thermal control in a single circuit (e.g., one thermal control circuit 113 for plural processors). Further, if multiple hotspots and diodes are included on one processor, this configuration simplifies reporting to the one processor.

Figure 11:
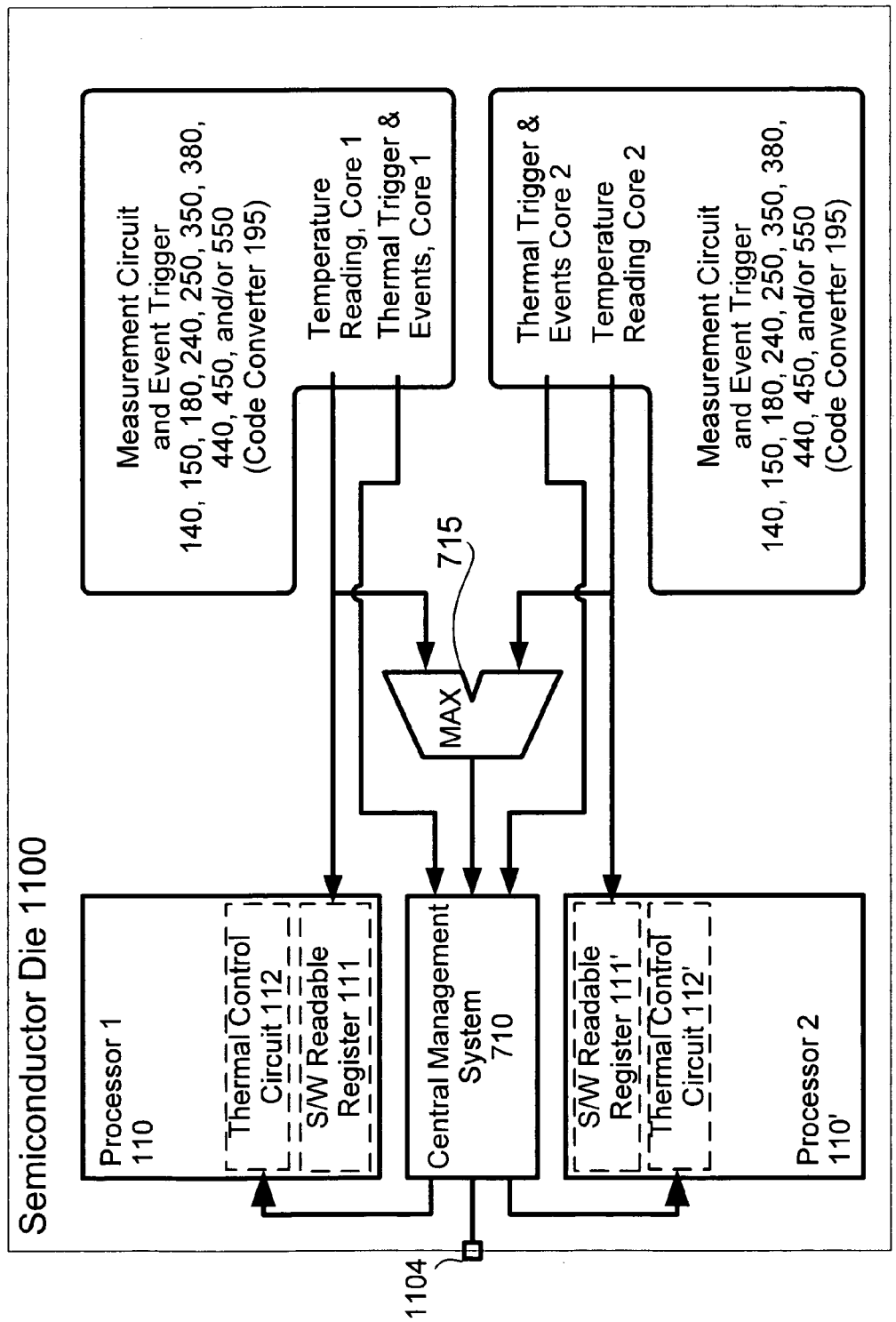
FIG. 11 illustrates a fourth embodiment of the invention, providing centralized thermal management for plural processor cores.

FIG. 11 illustrates a semiconductor die 1110 comprising a plurality of processors, each processor being monitored by a thermal trigger circuit, a measurement circuit, and an events circuit, as described in the other embodiments. Additionally, central management system 710 comprises a routing matrix that accepts temperature indications and thermal event indications and routes them to the individual processor cores based on a decision table stored in routing matrix. The decision table can be held, for example, in a volatile memory or non-volatile memory, and either be fixed or loaded (e.g., by the BIOS). Central management system 710 can also generate interrupts to either one or both cores, and/or can generate interrupts through a programmable interrupt controller ("PIC") or controllers. A PIC can be provided for each processor, or a centralized PIC can be provided to handle interrupts for multiple processors. One type of PIC is an advanced programmable interrupt controller ("APIC"; e.g., Intel® 82093AA I/O Advanced Programmable Interrupt Controller). A PIC can be provided in the processor-internal or external thermal control circuits, can be included as a separate circuit, or can be integrated into the central management system 710.

As an example of operation, a thermal event can initiate a change of the processor frequency if the temperature is high. A policy of the central management system 710 could be to reduce both core's frequency if either core is high. Another, more complex, policy would be to first reduce one core frequency only. If after some time temperature does not go down, the other core frequency and operating voltage would also be reduced. Implementation of this second policy can be accomplished by having a timer feedback to the routing matrix. When the decision table indicates to reduce operations in one processor but not the other, the timer begins counting. When the timer expires, a signal is fed back to the input of the routing matrix, resulting in a reduced operation for the second processor. The delay time can either be fixed, pre-stored in a register, or output by the routing matrix.

Logic circuit 715 compares the measured temperature readings from the plurality of measurement circuits, and provides central management system 710 with a highest of the measured temperature readings as a maximum measured temperature value of the die.

In addition, the central management system 710 can provide central reporting capability. Each core normally can access only its own register set. Central management system 710 can report to each core the package state such as the maximum measured temperature, status bits, etc. Additionally, lookup table entries within central management system 710 can provide some or all of the values used as programmed thresholds for both critical point and thermal events, adapting system thresholds during operation. Central management system 710 can also provide control signals at output 1104 for off-die thermal management.

While the above embodiments utilize a diode for sensing a temperature within a hotspot, any p-n junction device that is sensitive to temperature can be used.

In the embodiments, interrupts used to direct the processor or processors include hardware interrupts, software interrupts such as operating system interrupts, and combinations thereof. Among other things, processor interrupts direct to the operating system may be used to generate native instructions.

Figure 12:
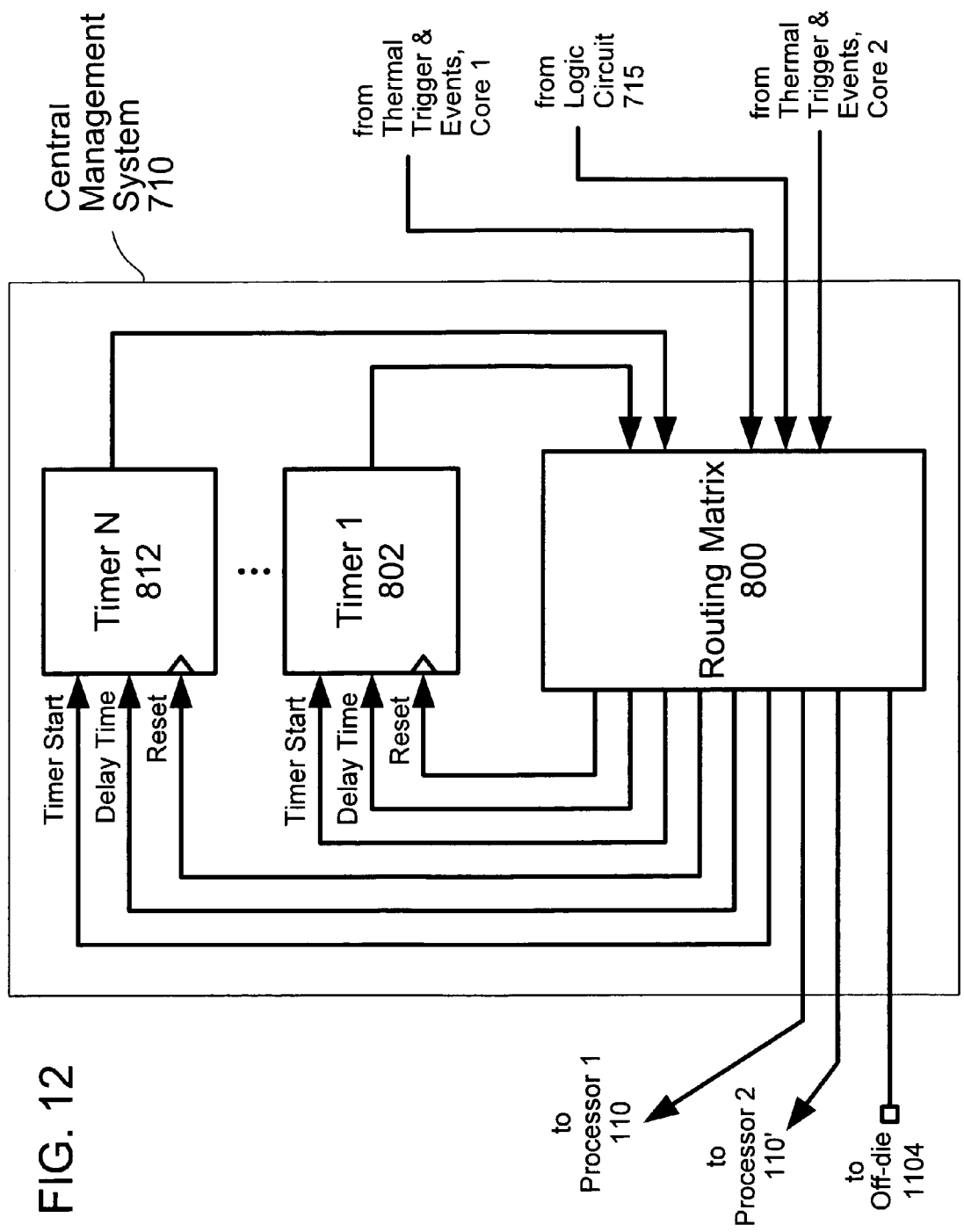
FIG. 12 illustrates an example of the Central Management System that appears in FIG. 11.

FIG. 12 illustrates an example of Central Management System 710. One-to-N timers 802, 812 provide feedback to routing matrix 800. The routing matrix 800 provides each timer a reset signal, a delay time, and a start signal. By including plural timers, plural possibilities can be simultaneously pending.

Figure 13:
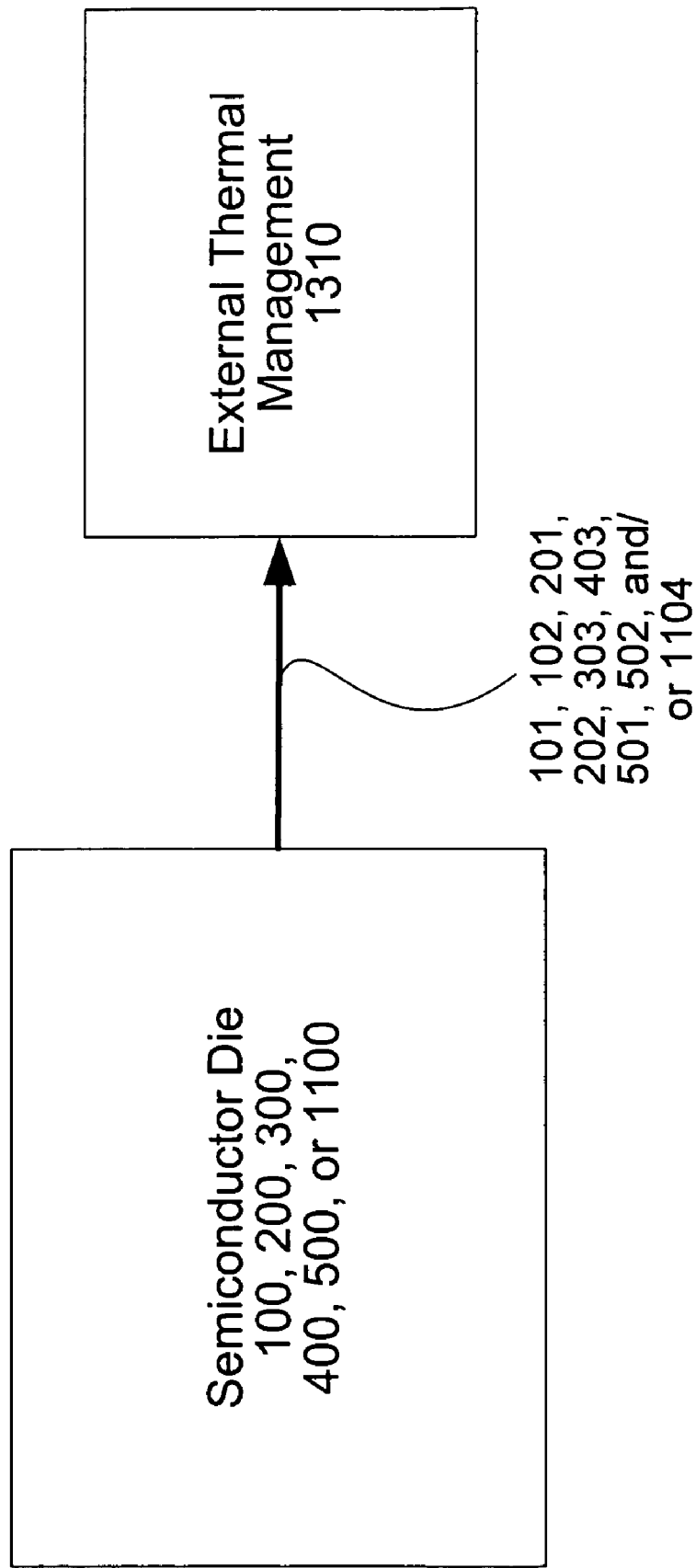
FIG. 13 illustrates a thermal management system including both on-die and off-die thermal management.

FIG. 13 illustrates a thermal management system including both on-die and off-die thermal management. Outputs 101, 102, 201, 202, 303, 403, 501, 502, and/or 1104 from the dies of the various embodiments, are used to control off-die thermal management 1310 elements, including fans, cooling systems, and power supplies. Control of such elements may include activating external fans or cooling systems, or modifying the output of the external power supply.

The p-n junctions are biased using a band-gap based device to maintain consistent operation as package temperatures change. An example of a band-gap current source for biasing the diodes is a band-gap comparator.

As can be understood from the above description, components of the various embodiments can be interchanged as a matter of design. It is contemplated that numerous modifications may be made to the present invention without departing from the spirit and scope of the invention as defined in the following claims.

What is claimed is:

1. A device comprising:
    a processor having a hotspot during operation, the hotspot being a localized region having a higher temperature than regions of the processor adjoining the hotspot;
    a p-n junction within the hotspot, a junction voltage of the p-n junction to change as a function of the temperature of the hotspot of the processor;
    a comparator to compare a voltage from the p-n junction with a voltage representing a first threshold temperature value;
    an analog-to-digital converter to convert the voltage from the p-n junction into a measured temperature reading;
    a logic circuit to monitor the measured temperature reading to determine occurrence of particular thermal events to direct the processor to modify processor-operation when a thermal event occurs; and
    a semiconductor die comprising the processor, the p-n junction, the comparator, the analog-to-digital converter, and the logic circuit.

2. The device according to claim 1, wherein the logic circuit comprises at least one digital comparator to compare the measured temperature reading with at least a second threshold temperature value.

3. The device according to claim 2, wherein said at least a second threshold temperature value is accessible to, and modifiable by, instructions executed the processor.

4. The device according to claim 1, wherein the logic circuit comprises a trend circuit to calculates trends of the measured temperature reading over a period of time, the trend circuit comprising:
    at least one memory element to register temperature at a previous time and a comparison circuit to compare this previous temperature to the current temperature.

5. The device according to claim 1, wherein the logic circuit comprises an averaging circuit to calculate an average of the measured reading over a period of time, the averaging circuit comprising:
    at least one memory element to accumulate an average result and at least one computation element to modify the average result in accordance to current temperature.

6. The device according to claim 1, wherein an output from the logic circuit indicating occurrence of a particular thermal event is provided as an output from the semiconductor die.

7. The device according to claim 1, the semiconductor die further comprising a register readable to instructions executed on said processor to store the measured temperature reading, or store a temperature value based on the measured temperature reading.

8. The device according to claim 7, wherein the register readable to instructions is model-specific register (MSR) address space of the processor.

9. The device according to claim 7, the semiconductor die further comprising a memory containing a look-up table, the measured temperature reading to be input into the memory and a scaled temperature reading to be output by the memory, the look-up table programmed to compensate for non-linearity in the measured temperature reading,
    wherein the scaled temperature reading to be stored in the register readable to instructions.

10. The device according to claim 1, the die further comprising:
- another processor having another hotspot, with another p-n junction, comparator, analog-to-digital converter, and logic circuit; and
- a routing matrix comprising memory storing a decision table, the routing matrix to receive the thermal event indications from the logic circuits, and receive outputs from the comparators, to route thermal event directives to the processors in accordance with the decision table.

11. The device according to claim 1, the die further comprising:
- another hotspot, with another p-n junction and another comparator, the another comparator to compare a voltage from the another p-n junction with the voltage representing the first threshold value; and
- a logic gate to receive outputs from the comparators and to signal if at least one of the hotspots exceeds the first threshold value.

* * * * *

UNITED STATES PATENT AND TRADEMARK OFFICE
CERTIFICATE OF CORRECTION

| | |
|---|---|
| PATENT NO. | : 7,878,016 B2 |
| APPLICATION NO. | : 11/025140 |
| DATED | : February 1, 2011 |
| INVENTOR(S) | : Efraim Rotem et al. |

It is certified that error appears in the above-identified patent and that said Letters Patent is hereby corrected as shown below:

In column 8, line 36, in claim 4, delete "calculates" and insert -- calculate --, therefor.

Signed and Sealed this
Nineteenth Day of April, 2011

David J. Kappos
*Director of the United States Patent and Trademark Office*